(12) United States Patent
Eick et al.

(10) Patent No.: US 10,379,235 B2
(45) Date of Patent: Aug. 13, 2019

(54) DETERMINISTIC PHASE CORRECTION AND APPLICATION

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 520 days.

(21) Appl. No.: 14/698,156

(22) Filed: Apr. 28, 2015

(65) Prior Publication Data

US 2015/0316672 A1    Nov. 5, 2015

Related U.S. Application Data

(60) Provisional application No. 61/986,958, filed on May 1, 2014.

(51) Int. Cl.
| | | |
|---|---|---|
| *G01V 1/30* | (2006.01) | |
| *G01V 1/00* | (2006.01) | |
| *G01V 1/28* | (2006.01) | |
| *G01V 1/145* | (2006.01) | |

(52) U.S. Cl.
CPC .............. *G01V 1/005* (2013.01); *G01V 1/145* (2013.01); *G01V 1/28* (2013.01); *G01V 1/307* (2013.01); *G01V 2200/14* (2013.01); *G01V 2210/1214* (2013.01); *G01V 2210/1295* (2013.01); *G01V 2210/1425* (2013.01); *G01V 2210/26* (2013.01); *G01V 2210/59* (2013.01)

(58) Field of Classification Search
CPC .......... G01V 1/005; G01V 1/28; G01V 1/307; G01V 2210/1214; G01V 2210/1295; G01V 2210/1425; G01V 2210/26; G01V 2210/59
USPC ........................................................ 702/104
See application file for complete search history.

(56) References Cited

U.S. PATENT DOCUMENTS

| | | | | |
|---|---|---|---|---|
| 5,173,880 A | * | 12/1992 | Duren ..................... | G01V 1/282 367/21 |
| 5,550,786 A | * | 8/1996 | Allen ..................... | G01V 1/366 367/23 |
| 5,715,213 A | | 2/1998 | Allen | |

(Continued)

FOREIGN PATENT DOCUMENTS

WO    2010053752 A2    5/2010

OTHER PUBLICATIONS

Chiu, Stephen K., et al—"High-Resolution Reservoir Mapping by Simultaneous Vibratory Sources", 2010, GeoCanada 2010—Working with the Earth, pp. 1-5; 5 pgs.

(Continued)

*Primary Examiner* — Long K Tran

(74) *Attorney, Agent, or Firm* — Conocophillips Company

(57) ABSTRACT

A method of more accurate phase encoding of phase offset vibrators used in simultaneous-multiple-sourcing 3D seismic mapping. The method measures the actual input energy and the proxy energy thereby determining a bulk error and a frequency-dependent error, both to be applied to correct the proxy energy. The corrected proxy energy is then used to perform actual seismic survey, and the inversion is then performed using the corrected proxy energy to source separate each vibe where the error is minimized.

8 Claims, 10 Drawing Sheets

(56) References Cited

U.S. PATENT DOCUMENTS

| | | |
|---|---|---|
| 5,721,710 A | 2/1998 | Sallas et al. |
| 6,161,076 A * | 12/2000 | Barr ................ G01V 1/36 |
| | | 367/117 |
| 7,295,490 B1 | 11/2007 | Chiu et al. |
| 7,864,630 B2 | 1/2011 | Chiu et al. |
| 8,000,168 B2 | 8/2011 | Eick et al. |
| 8,004,931 B2 | 8/2011 | Eick et al. |
| 8,371,416 B2 | 2/2013 | Eick et al. |
| 8,467,267 B2 | 6/2013 | Eick et al. |
| 8,717,846 B2 | 5/2014 | Eick et al. |
| 8,893,848 B2 | 11/2014 | Eick et al. |
| 8,897,094 B2 | 11/2014 | Eick et al. |
| 8,958,267 B2 | 2/2015 | Eick et al. |
| 8,982,664 B2 | 3/2015 | Eick et al. |
| 9,025,414 B2 | 5/2015 | Cao et al. |
| 9,052,410 B2 | 6/2015 | Chiu et al. |
| 9,116,255 B2 | 8/2015 | Eick et al. |
| 9,164,184 B2 | 10/2015 | Eick et al. |
| 9,176,242 B2 | 11/2015 | Eick et al. |
| 9,213,119 B2 | 12/2015 | Eick et al. |
| 9,217,796 B2 | 12/2015 | Eick et al. |
| 9,217,798 B2 | 12/2015 | Eick et al. |
| 9,217,799 B2 | 12/2015 | Eick et al. |
| 9,229,120 B2 | 1/2016 | Eick et al. |
| 9,239,220 B2 | 1/2016 | Eick et al. |
| 9,250,336 B2 | 2/2016 | Eick et al. |
| 9,279,896 B2 | 3/2016 | Cao et al. |
| 9,291,727 B2 | 3/2016 | Eick et al. |
| 9,291,728 B2 | 3/2016 | Eick et al. |
| 9,395,460 B2 | 7/2016 | Eick et al. |
| 9,529,102 B2 | 12/2016 | Eick et al. |
| 9,726,769 B2 | 8/2017 | Eick et al. |
| 9,846,248 B2 | 12/2017 | Eick et al. |
| 10,114,132 B2 | 10/2018 | Eick et al. |
| 2008/0065333 A1 * | 3/2008 | Beasley ................ G01V 1/28 |
| | | 702/17 |
| 2010/0208554 A1 | 8/2010 | Chiu et al. |
| 2011/0272206 A1 * | 11/2011 | Eick ................ G01V 1/04 |
| | | 181/112 |
| 2012/0014212 A1 | 1/2012 | Eick et al. |
| 2012/0028775 A1 | 2/2012 | Humphries et al. |
| 2012/0033529 A1 * | 2/2012 | Eick ................ G01V 1/28 |
| | | 367/38 |
| 2012/0035853 A1 | 2/2012 | Eick et al. |
| 2012/0039150 A1 | 2/2012 | Eick et al. |
| 2012/0287755 A1 * | 11/2012 | Eick ................ G01V 1/37 |
| | | 367/41 |
| 2013/0163381 A1 * | 6/2013 | Sallas ................ G01V 1/005 |
| | | 367/41 |
| 2014/0188395 A1 * | 7/2014 | Poole ................ G01V 1/364 |
| | | 702/17 |
| 2015/0078128 A1 | 3/2015 | Eick et al. |
| 2017/0059727 A1 | 3/2017 | Eick et al. |

OTHER PUBLICATIONS

Shaw, S.A., et al—"Vibroseis Source Signature Uncertainty and Its Impact on Simultaneous Sourcing", 2009, SEG Houston 2009 International Exposition and Annual Meeting, Oct. 25-30, 2009, pp. 11-15; 5 pgs.

Chiu, Stephen K., et al.—"High Fidelity Vibratory Seismic (HFVS): Robust Inversion Using Generalized Inverse", 2005 SEG Annual Meeting, Nov. 6-11, 2005; 5 pgs.

Chiu, Stephen K., et al—High Fidelity Vibratory Seismic (HFVS): Optimal Phase Encoding Selection, 2005 SEG Annual Meeting, Nov. 6-11, 2005; 4 pgs.

International Search Report for PCT/US20151027979 dated Aug. 10, 2015, 1 pg.

* cited by examiner

DETERMINISTIC PHASE CORRECTION AND APPLICATION

CROSS-REFERENCE TO RELATED APPLICATIONS

This application is a non-provisional application which claims the benefit of and priority to U.S. Provisional Application Ser. No. 61/986,958 filed May 1, 2014, entitled "Deterministic Phase Correction and Application," which is hereby incorporated by reference in its entirety.

FEDERALLY SPONSORED RESEARCH STATEMENT

Not applicable.

FIELD OF THE DISCLOSURE

The disclosure generally relates to 3D seismic modeling of reservoirs using simultaneous-multiple-sourcing seismic systems, such as ZenSeis®.

BACKGROUND OF THE DISCLOSURE

"Seismic" waves are mechanical perturbations that travel in the Earth at a speed governed by the acoustic impedance of the medium in which they are travelling. The acoustic (or seismic) impedance, Z, is defined by the equation:

$$Z = V\rho$$

where V is the seismic wave velocity and $\rho$ (Greek rho) is the density of the rock.

The acoustic pulses are typically generated by vibrating the earth with specially equipped trucks, a technology known as "Vibroseis" that was invented by Conoco about 50 years ago. When a seismic wave travelling through the ground encounters an interface between two materials with different acoustic impedances, some of the wave energy will reflect off the interface and some will refract through the interface.

At its most basic, the seismic reflection techniques consist of generating seismic waves and measuring the time taken for the waves to travel from the source, reflect off an interface and are detected by an array of receivers (or geophones) at the surface. Knowing the travel times from the source to various receivers, and the velocity of the seismic waves, a geophysicist then attempts to reconstruct the pathways of the waves in order to build up an image of the subsurface.

Oil and gas companies rely on 3D seismic data to better delineate fields and identify new reserves, but most companies are now asking more of their 3D seismic surveys. Advances in acquisition, processing and interpretation techniques are being used for complete volume coverage of the reservoir. High-resolution borehole seismic surveys help combine the surface seismic with log and core data to allow log properties such as lithology, porosity and fluid type to be mapped field-wide. With this more complete understanding of the reservoir, production engineers can optimize development and recover additional reserves.

In the process of acquiring seismic data, seismic energy is generally applied over time where the vibrators begin a sweep by vibrating initially at a low frequency and progressively increasing the frequency such that an entire sweep of the frequency range is delivered within a certain time period. Sweeps of four to eight seconds have been standard practice for years, but longer sweeps are becoming increasingly common with sixteen second sweeps and forty eight second sweeps now being used.

The costs for a seismic survey can be quite expensive and therefore much effort has gone into improving the efficiency of seismic surveying—getting the most from a particular dataset. One advance is to operate several seismic vibrators at the same time all making a similar sweep, but in different phases with respect to one another. In other words, if the baseplate of one vibrator is going up while another is going down, the two vibrators would be about 180 degrees out of phase. Operating four vibes that are out of phase with respect to one another is known and commercially in use as the HFVS or ZenSeis® geophysical prospecting systems, among others.

Typically, with four vibrators, at least four separate sweeps are performed where the phase relationship between the vibrators is changed between sweeps to enhance the distinctiveness of each vibrator in the data record. The distinctiveness of the data sets, allows the data to be separated and accorded to a single source, thus providing the most information in a given amount of time.

Being out of phase at an orthogonal relationship to one another is not the most effective way of distinguishing the sweep data. If one vibrator is at zero degrees phase and the next vibrators is 90 degrees ahead, the next is 180 degrees ahead and the last is 270 degrees ahead, this combination is described as orthogonal, such that everything is 90 or 180 degrees different from one another. In this arrangement, echoes and in particular even harmonics from the subsurface geological structures are created and are somewhat difficult to distinguish from the principal reflections. Thus, the data is easily confused, and the data from each of the vibrational sources may not be accurately separated.

Thus, it is preferred that phase differences or offsets are non-orthogonal, which means the phase differences between the four vibrators is not equal to 90 degrees or similar angles. The non-orthogonal phase differences have to be optimally chosen to minimize leakages of the harmonics and cross talk between the sources during separation. U.S. Pat. No. 7,295,490 explains the derivation of the phase encoding in more detail. Unfortunately, equipment and circumstances are never perfect and vibrators that are supposed to be out of phase may actually operate at a phase offset that becomes difficult to distinguish due to equipment drift or wear and tear. In this circumstance, it may not be apparent to the operators that the phase excursion or drift has happened until after much or all of the survey is completed. The cost of re-running the survey or the portions of the survey may not be justifiable.

Many efforts have been made to address phase issues and to obtain the most information from the seismic data.

U.S. Pat. No. 8,467,267, for example, describes an approach whereby the seismic recording system comprises a) two or more seismic energy sources, and b) one or more data recorders, wherein said seismic energy sources are operated asynchronously with a random or non-uniform lag between consecutive sweeps. The energy source signatures are recorded, and said data is synchronized through inversion of the recorded data by the energy source signatures.

US20100208554 relates to methods and equipment for acquiring and processing marine seismic data that correct source movement during inversion. By correcting source movement during inversion, multiple data sets may be acquired independently during overlapping time periods thus reducing the number of sweeps required, generating greater amounts of data, and simplifying data processing. In more detail, the system uses two or more independent phase encoded sources to transmit multiple simultaneous sources, and said independent phase encoded source receiver signals are separated and stacked during inversion of the recorded seismic signals.

US20120033529, also by the inventors, attempts to solve the phase error problem by a technique that quickly creates a more accurate source signature delivered by analysis of the source generated data contamination present in the separated data where such data contamination is the presence of one source's energy in another source's data after separation. The technique is to invert a segment of the data using a seed source signature and compute an error that reflects the data contamination observed in the separated source data. The source signature is iteratively revised as the segment is continually inverted with the goal of finding the optimal source signature that provides the lowest computed error. The source signature that provides the lowest error is, or is very close to, the true source signature and is then used in the separation process for the entire composite data set.

US2012028775 attempts to address phase errors by correcting data prior to inversion where the correction is provided to correct for the filtering effect of the earth. The method includes the acquisition of seismic data to create a data set for a survey area. An initial source wavelet is identified and an expected response to the initial source wavelet by one or more seismic receivers taking into consideration the geometric relationship of the receivers to the source is identified. A computed earth response is created for each source and receiver pair based on the geology between the source and receiver and the computed earth response is applied to the expected response to the initial source wavelet to create a source true estimated wavelet for each source receiver pair. The source true estimated wavelet is then used for at least one further processing step of the acquired data set such as inverting, separating, de-signaturing or wavelet de-convolving.

US20120039150 relates to the acquisition of seismic data using many seismic sources simultaneously or where the sources are emitting in an overlapping time frame but where it is desired to separate the data traces into source separated data traces. The key is having each seismic source emit a distinctive pattern of seismic energy that may all be discerned in the shot records of all of the seismic receivers. Distinctive patterns are preferably based on time/frequency pattern that is distinctive like an easily recognized song, but may include other subtle, but recognizable features such a phase differences, ancillary noise emissions, and physical properties of the vibes such as the weight and shape of the pad and the reaction mass and the performance of the hydraulic system and prime energy source.

Inventors' own extensive testing data derived from vertical seismic profile (VSP) projects suggest that the vibes true phase and the reported phase by the vibe sweep controller has an overall bulk shift and a frequency dependent shift. It was also noted from other tests, that this shift may vary per the number of sweeps at a particular spot of ground and with the individual vibrator. Testing of the inverted results show that as little as a few degrees of error causes significant cross talk between the shots. To improve the separation between the vibes on different shot points this error must be compensated for.

Although many people have attempted to address known vibration phase error corrections through various feedback circuits, no one has published the use of independent measurements to quantify the errors themselves, especially acknowledging the frequency-dependent phase error. Thus, one of the sources of error is currently unrecognized and/or not compensated for.

SUMMARY OF THE DISCLOSURE

The advancement of the simultaneous-multiple-sourcing (SMS) technology in seismic land acquisition has matured from the research stage to routine production. The key benefits of this technology are improving data bandwidth, increasing spatial resolution, and reducing acquisition cost. However, the increase of productivity also adds more complexity in field acquisition and data processing. Understanding the practical challenges of acquisition and processing associated with simultaneous multiple sources, one can fully realize the potential benefits of this technology.

One of the requirements of the SMS technology is to encode a unique phase rotation or offset into the vibrator sweep to ensure a unique separation of multiple-source gathers into single-source gathers. A poor phase-encoding scheme leads to a poor source separation, and renders the data less valuable, if not worthless. This is particularly true of phase based SMS techniques but even conventional slip sweep or ISSS based approaches can benefit from more unique source signals to separate the shot records.

We illustrate the importance of the phase-encoding scheme herein with two examples shown in FIGS. 1 and 2. The first example compares two identical experiments with the same source and receiver recording geometry, except that one survey employed an optimized phase-encoding scheme and the other employed a non-optimized scheme. FIGS. 1A and 1B show a typical shot record with and without the optimized phase-encoding scheme. Cross talk among vibrators is not visible on the shot record with the optimized phase-encoding scheme, but the cross talk clearly interferes with the dataset in FIG. 1B.

The second example examines the artifacts when the data acquisition is not carried out properly. Both surveys were acquired with the same source and receiver recording geometry, and the acquisition geometry was the same as the first example, having four simultaneous sources with four repeated sweeps at the same source locations. The proper-acquisition sequence produced good-quality single-source gathers (FIG. 2A). However, during the acquisition stage, the vibratory phases of sweep 4 were mistakenly duplicated as sweep 1. The incorrect vibratory phases produced unusable data (FIG. 2B).

The present invention relates to a novel method of ensuring correct phase encoding, such that data value is optimized and the most value realized from the SMS sweep.

The invention is derived from experimental testing conducted by the inventors using the load cell system that ConocoPhillips has developed (for example U.S. Pat. No. 8,371,416, which is incorporated by reference in its entirety and further discussed below) and is using in the field. During these tests and also with data derived from VSP's, it was noted that the vibe controller's true phase and the reported phase by the vibe sweep controller had both a bulk shift and a frequency dependent shift. It was also noted from other tests, that this shift varied per the number of sweeps at a particular spot of ground and with the individual vibrator. Testing of the inverted results show that as little as a few degrees of error causes significant cross talk between the shots. To improve the separation between the vibes on different shot points, this error must be compensated for.

We have already filed a patent application for an inversion based approach to address phase errors (US20120033529), but this inversion based approach assumes that our goal is the maximum separation between the shots at the expense of accuracy of measurement of the actual phase error.

By contrast, observation of the actual test data indicates that the measured phase error appears to be mostly made up sweep-by-sweep variations and it is localized as a bulk shift over a certain frequency window. If we could measure the frequency dependent phase error in the field, we would then reduce the problem dramatically, allowing the inversion based approach to compensate for the last frequency dependent variations. The predicted error may comprise two components: one is a bulk shift phase error that is likely related to ground compaction and compliance, and the second error is the sweep-dependent and also frequency-dependent error that is related to the intrinsic wear and tear on the vibe, ground stiffness and compaction, among other factors. Therefore, for every vibe, every sweep and every ground position, there is potentially a bulk shift and a frequency-dependent error.

We have successfully measured this phase error inadvertently during the NEES-3D and Stocker 4D VSP surveys with our load cell system described in U.S. Pat. No. 8,371,416. It was known that several factors in the vibes may contribute to the phase error, including the discrepancy between the estimate (from vibe controller) and true phase/force exerted by the baseplate, and the baseplate flexure, among others.

To compensate for the error, a load cell system was proposed, in which multiple load cells are installed in the baseplate of a vibe to measure the true vibrational frequency/force/phase of the generated signal, and the measured result can be used in inversion to obtain more accurate images. Using this system, we placed the vibe on top of the load cells and measured the variation from sweep to sweep of the phase error. Because true phase/force/signal is used instead of the error-prone estimate, better inversion results are obtained for source separation.

Another way to measure variation from sweep-to-sweep of the phase error uses an outrigger probe that would establish a no movement baseline off the vibe, and then have either an optical sensor or electromechanical linear motor sensor that would measure the true phase shift of the baseplate to the desired output. The outrigger probe serves to provide a baseline, where the optical sensor or electromechanical motor sensor installed at the baseplate senses the actual vibrational signals to be compared with theoretical values to correct any errors.

In another application (US20110272206, which is incorporated by reference in its entirety) we developed the idea of a capacitance based pad below the plate that would physically measure the ground force phase lag by a sensor. Typically, vibrators are transported by carrier vehicle, where the force from the vibrating mass is transferred through the baseplate into the earth at a desired vibration frequency. This type of vibrational seismic exploration system typically uses a quasi-sinusoidal reference signal, or so-called pilot signal, of continuously varying frequency, selected band-width, and selected duration to control the introduction of seismic waves into the earth. The pilot signal is converted into a mechanical vibration in a land vibrator having a baseplate that is coupled to the earth.

By attaching a capacitance pad below the baseplate, the physical deformation of the capacitance pad upon contact with earth will translate into electrical signals regarding the force, frequency, phase and amplitude of the vibration to be compared with the theoretical values issued by the controller.

Other methods could be used to obtain this error data, including separate measuring units on the ground but in close proximity to the baseplate of the vibe, so as to measure the more accurate source energy signal (including phase and amplitude) emitted into the ground.

After measuring the frequency-dependent phase error, the second step is to apply the error data to the estimated ground force or whichever input source signal being used as a proxy for the actual source signal in the inversion process. We have found in some cases using the reaction mass or baseplate measurements are better than the calculated ground force estimate if the vibe is an older style or particularly worn. By adding the error data to the input proxy for the actual source signal, one brings the vibes signature back closer to the true signature, which would reduce or significantly eliminate the cross talk from shot point to shot point for each setup, and therefore achieve better source separation from better inversion images. The input data in the inversion process needs to be corrected by the shift in order to correctly separate the individual source records, so that any errors in the estimated source signal are minimized.

In the preferred embodiment of the invention, load cells would be used to obtain the bulk shift and frequency dependent error function by measuring the true ground force. Once these functions were obtained for each of the vibes, the load cells would be moved to another spot in advance to the vibes and the same error functions would be re-measured. Any variation would be smoothly introduced into the correction step as described above and the process would continue and repeat itself until all source positions in the survey are completed.

It has been noted that on similar ground conditions, the error function tends to be reasonably consistent/repeatable from day to day, but it does vary from different types of ground. Thus, if the error functions were measured in plowed fields and the vibes moved into unplowed fields, it would be ideal to re-measure the error functions again. Also if the errors were measured under dry conditions and it rains, it would be ideal to re-measure the error function under wet conditions.

The technical and economic advantage of this method is that it provides an accurate and correct inversion of the data so that the seismic data processors starts with less shotpoint-to-shotpoint contamination. The invention improves the source separation during the inversion process and generates cleaner data for the processors to start with.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as instructions for use, buffers and the like.

The following abbreviations are used herein:

| ABBREVIATION | TERM |
|---|---|
| HSVF | High-Fidelity-Vibratory-Seismic |
| SMS | simultaneous-multiple-sourcing |
| VSP | Vertical seismic profile |
| ZenSeis® | A ConocoPhillips proprietary non-orthogonal phase encoded data acquisition technique |

DETAILED DESCRIPTION

Figure 1:
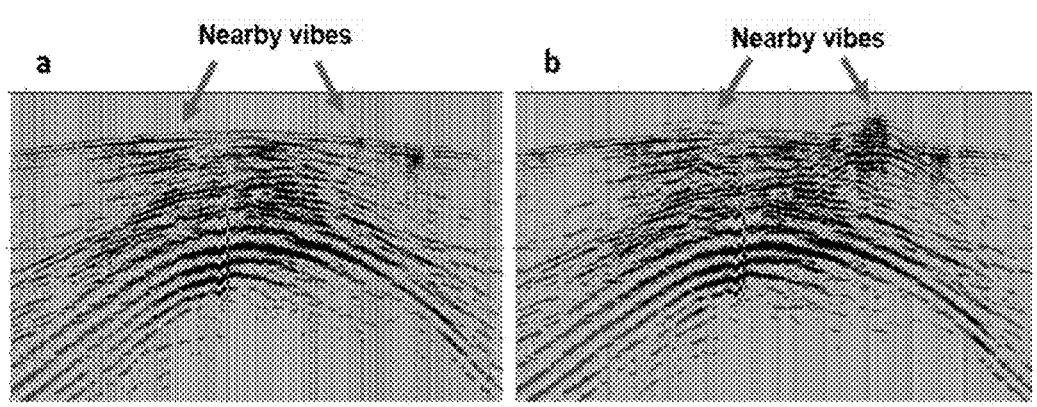
FIG. 1. Optimized and non-optimized phase-encoding scheme (both surveys were acquired with the same source and receiver geometry): (a) shot record with optimized scheme, showing that the interference from nearby vibes is not visible, (b) shot record with non-optimized scheme, showing resulting interference from nearby vibes.

The disclosure provides a novel method of phase encoding, wherein the actual phase error is measured and compensated for. This makes the dataset used for subsequent inversion and analysis much more accurate, and thus better 3D seismic surveys are provided.

The invention comprises one or more of the following embodiments, in any combination thereof:

A method of source separating composite seismic data that includes signals from two or more seismic sources, said two or more seismic sources operating at the same time but in offset phases and delivering source seismic energy signals into the earth, and at least one seismic receiver receiving seismic data from said two or more seismic sources and recording the seismic energy received by said seismic receiver as the composite seismic data, and wherein proxy aux channels are used to generate the source seismic energy signals, the method comprises: a) obtaining a baseline measurement of source seismic energy signal at each frequency for each of said seismic sources; b) obtaining a simultaneous proxy measurement of the source seismic energy signal at each frequencies for each of said seismic sources; c) measuring a bulk sweep to sweep phase variation between the baseline measurement of step (a) and the proxy measurement of step (b) of the output source seismic energy to determine the bulk phase error; d) measuring a frequency dependent sweep to sweep phase variation between the baseline measurement of step (a) and the proxy measurement of step (b) to determine the frequency dependent phase error; d) applying the bulk and frequency dependent phase errors to the proxy aux channels to create a corrected aux channel for each of the two or more seismic sources for each sweep; e) inputting the corrected proxy aux channels for the seismic sources and receiving and recording the composite seismic data with the at least one seismic receiver into an inversion program; f) performing an inversion on the revised composite seismic data to source separate the revised composite seismic data.

A method of source separating composite seismic data that includes signals from two or more seismic sources, said two or more seismic sources operating at the same time but in offset amplitude and delivering source seismic energy signals into the earth, and at least one seismic receiver receiving seismic data from said two or more seismic sources and recording the seismic energy received by said seismic receiver as the composite seismic data, and wherein proxy aux channels are used to generate the source seismic energy signals, the method comprises: a) obtaining a baseline measurement of source seismic energy signal at each frequency for each of said seismic sources; b) obtaining a simultaneous proxy measurement of the source seismic energy signal at each frequencies for each of said seismic sources; c) measuring a bulk sweep to sweep amplitude variation between the baseline measurement of step (a) and the proxy measurement of step (b) of the output source seismic energy to determine the bulk amplitude error; d) measuring a frequency dependent sweep to sweep amplitude variation between the baseline measurement of step (a) and the proxy measurement of step (b) to determine the frequency dependent amplitude error; e) applying the bulk and frequency dependent amplitude variations to the proxy aux channels to create a corrected aux channel for each of the two or more seismic sources for each sweep; f) inputting the corrected proxy aux channels for the seismic sources and receiving and recording the composite seismic data with the at least one seismic receiver into an inversion program; g) performing an inversion on the revised composite seismic data to source separate the revised composite seismic data.

A method of source separating composite seismic data wherein two or more seismic sources are not intentional phase varied or frequency varied and wherein operated at the same basic sweep.

A method of source separating composite seismic data that incorporates both phase and amplitude errors into generating corrected proxy aux channels to facilitate source separation in an inversion.

An improved method of source separating composite data for a seismic survey by acquiring receiver data corresponding to reflected phase encoded vibratory signals simultaneously generated by multiple sources and inverting said receiver data to separate said phase encoded vibratory signals; the improvement comprising measuring a bulk phase shift error and a frequency-dependent phase shift error at least once for a particular ground condition, acquiring receiver data corresponding to reflected phase encoded vibratory signals simultaneously generated by multiple sources, and compensating for said bulk phase shift error and said frequency-dependent phase shift error before said inverting step, and inverting said receiver data to separate said phase encoded vibratory signals.

A method of source separating composite seismic data, comprising: measuring a bulk sweep-to-sweep phase variation to determine a bulk phase error; measuring a frequency dependent sweep-to-sweep phase variation to determine a frequency dependent phase error; correcting acquired seismic data to account for said bulk phase error and said frequency dependent phase error to create revised composite seismic data; performing an inversion on said revised composite seismic data to source separate the revised composite seismic data into source separated seismic data.

The present invention is exemplified with respect to correcting the cross-talk resulted from phase shift, especially in ZenSeis® or HFVS. However, this method is exemplary only, and the invention can be broadly applied to other types of seismic survey that involves frequency-dependent phase shifts. The experiments and examples described herein are intended to be illustrative only, and not unduly limit the scope of the appended claims.

Acquisition techniques such as HFVS (U.S. Pat. Nos. 5,550,786, 5,715,213, and U.S. Pat. No. 5,721,710), ZenSeis® geophysical prospecting systems (U.S. Pat. No. 7,295,490), Unique Composite Relatively Adjusted Pulse (US20120035853) and Continuous Composite Relatively Adjusted Pulse (US20120014212), all of which are incorporated herein, are examples of acquisition techniques that utilize coded source signatures to aid in the separation of usable seismic data resulting from the simultaneously or near simultaneously activation of multiple seismic source. The seismic acquisition methods Unique Composite Relatively Adjusted Pulse and Continuous Composite Relatively Adjusted Pulse used pulse sources to encode unique source signatures. The examples of HFVS and ZenSeis® geophysical prospecting systems utilize vibrator type sources and are better known in industry and are the easiest examples of the application of this present invention. For this reason vibrator energy sources will be used as the example for explaining this invention, but it should be understood that the invention is applicable to any type of multiple encoded seismic source system where source separation is to be accomplished.

Figure 4A:
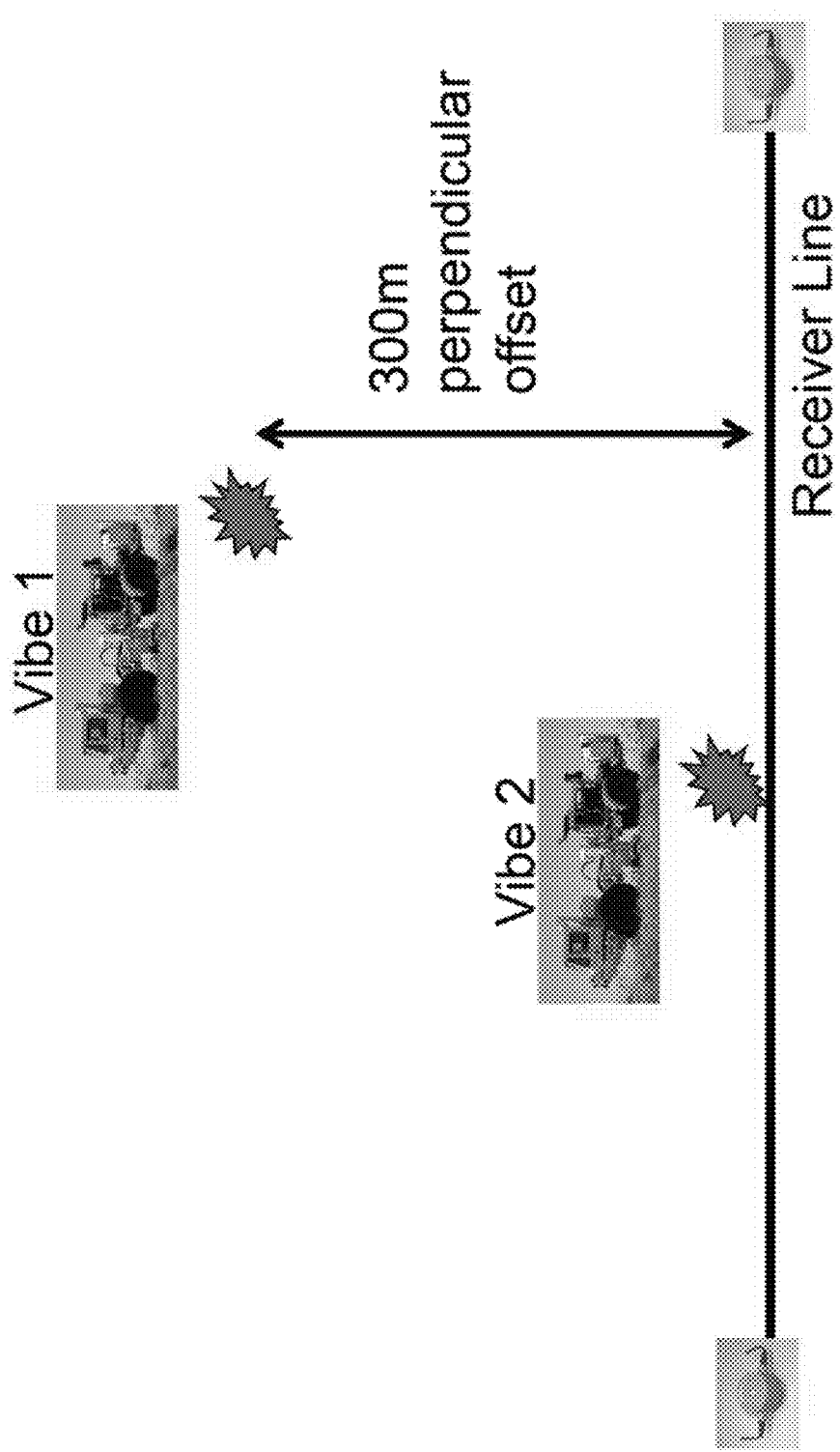
FIG. 4A-F depicts the setup and measurement of frequency-dependent phase errors.

To validate our theory that the undesirable phase shift contributes to crosstalk between signals from different vibes, we performed a sweep with constant phase rotation to one of the two GFEs in setup and measure the crosstalk profile. The setup of the vibes and receivers are illustrated in FIG. 4A, in which Vibe 1 has a 300-meter perpendicular offset from the receiver line, whereas Vibe 2 is in line with the receiver line. Vibes 1 and 2 have orthogonal phase encoding for experimental purpose only, and in actual survey there can be different configurations with non-orthogonal phase encoding.

Figure 2:
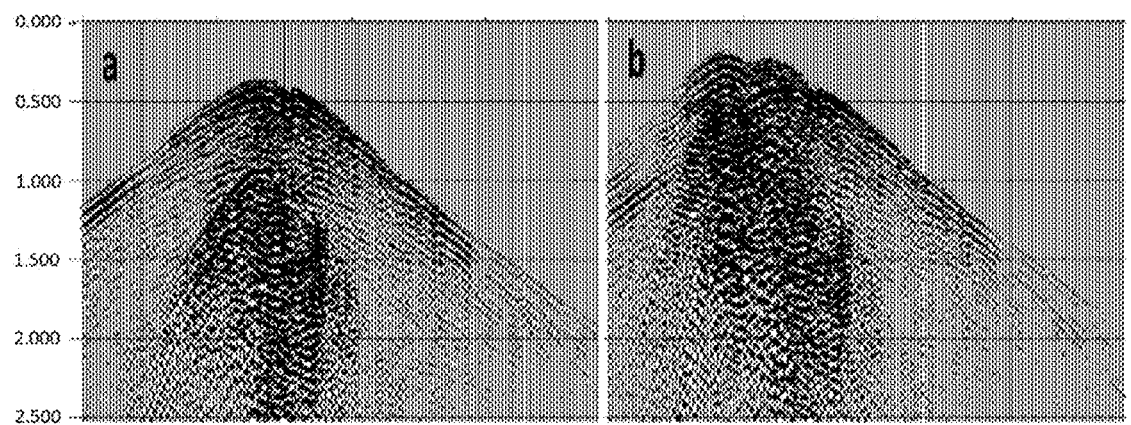
FIG. 2. Correct and incorrect phase-encoding sequence (both surveys were acquired with the same source and receiver geometry): (a) shot record after source separation with correct-phase sequence, (b) shot record after source separation with incorrect-phase sequence, producing unusable data.
Figure 4B:
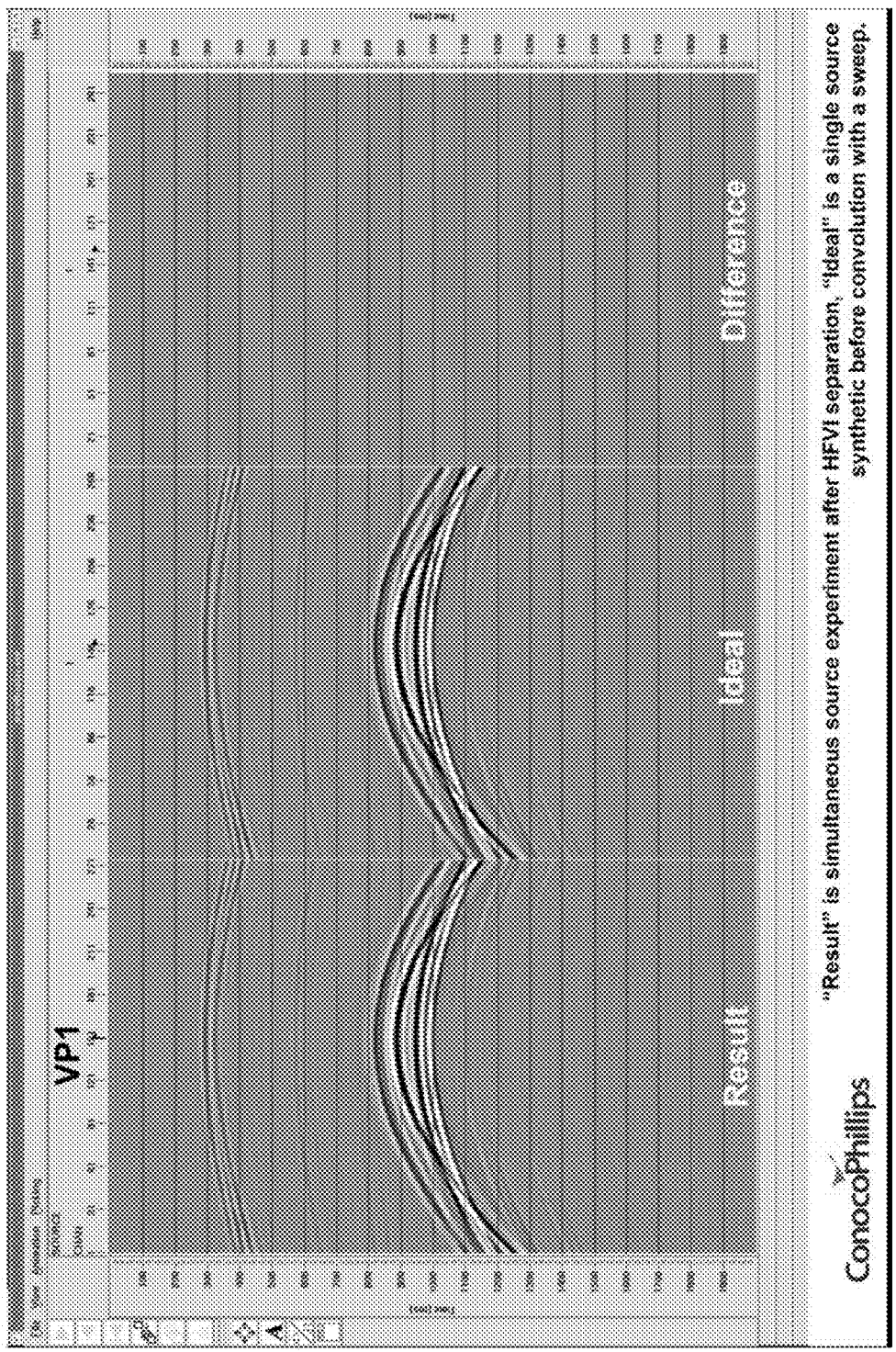
Figure 4C:
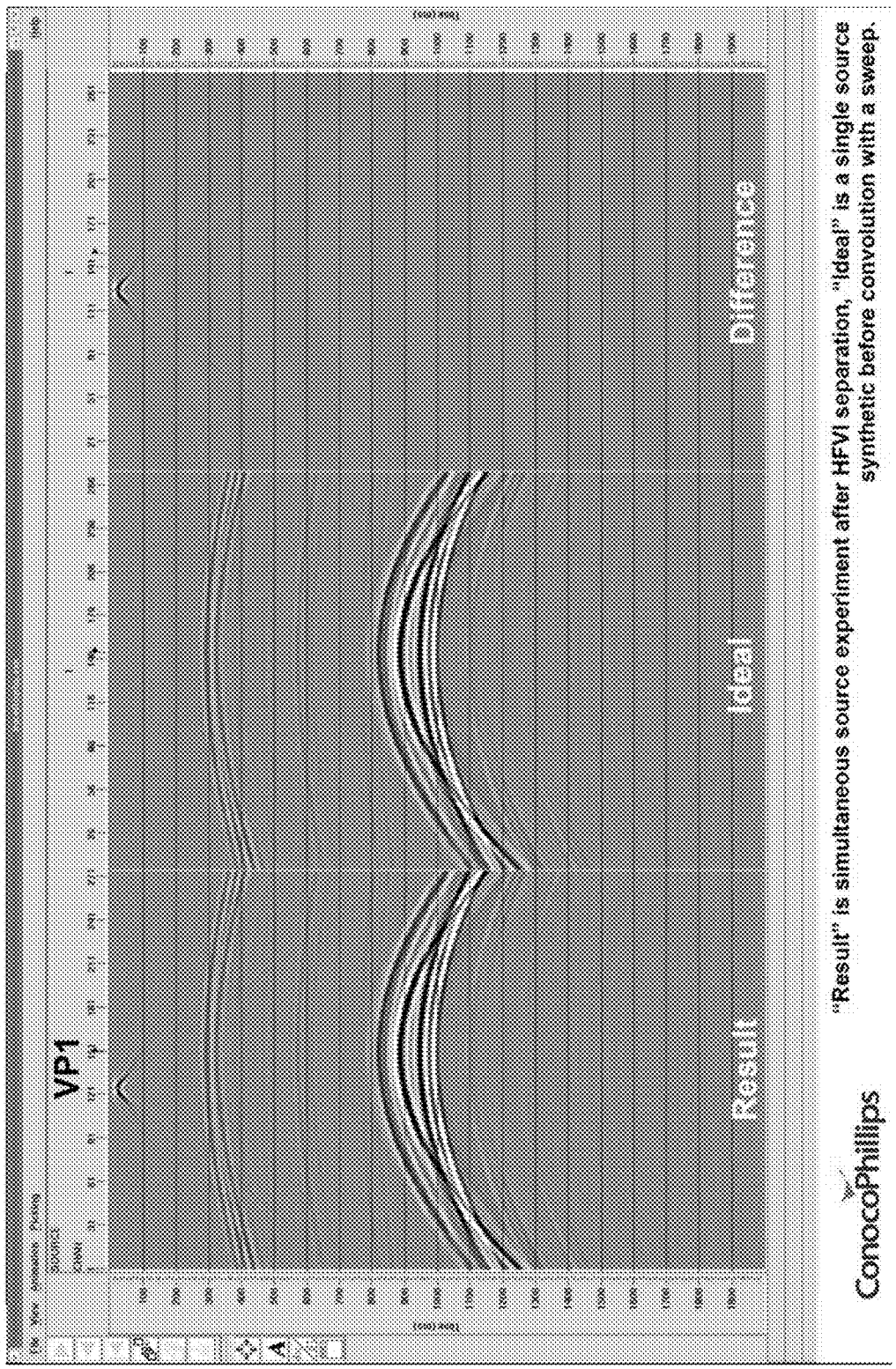
Figure 4D:
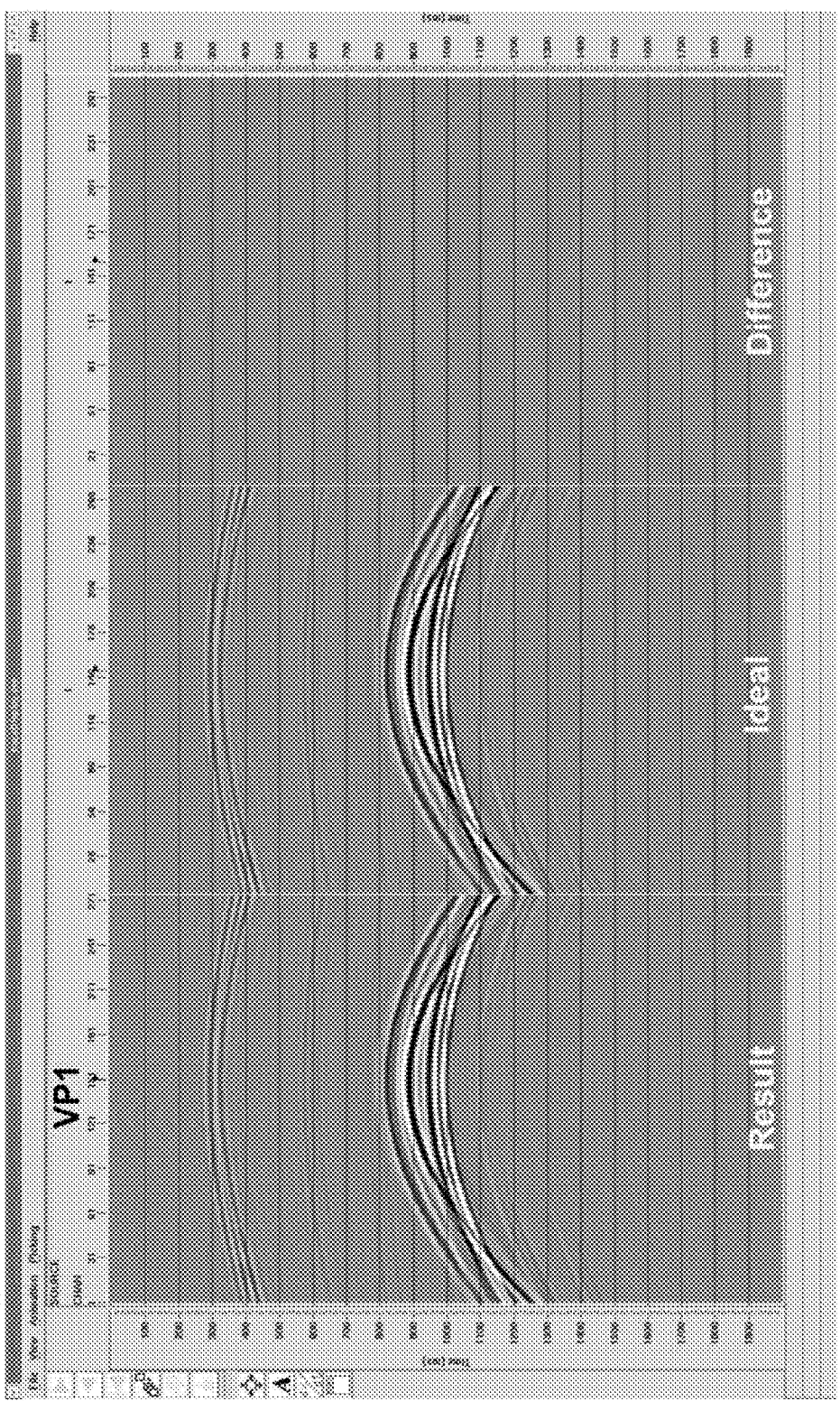
Figure 4E:
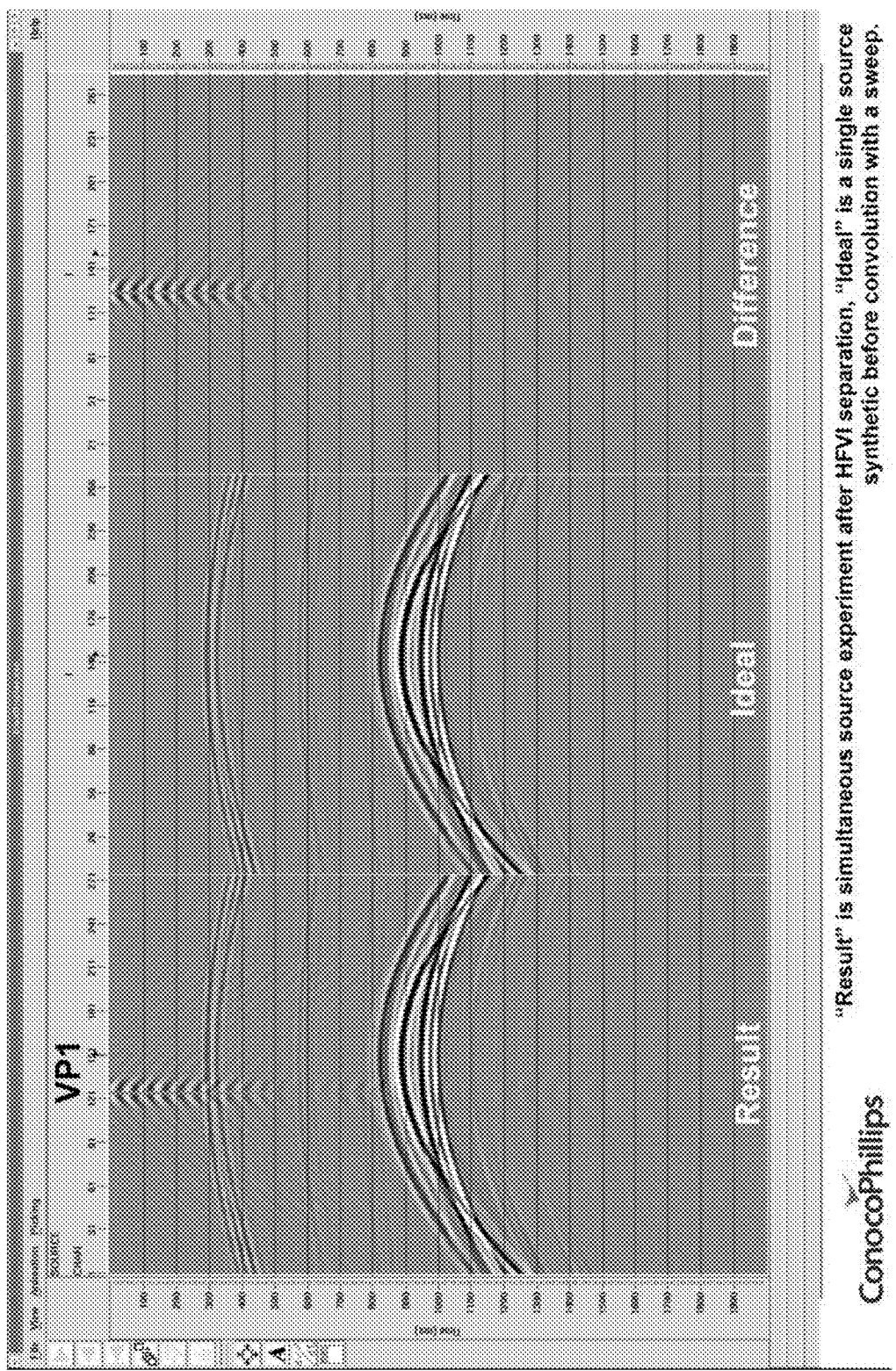

FIG. 4B shows the ideal results without crosstalk, FIG. 4C shows the crosstalk when there was an artificial 2° phase shift at Vibe 1 during a sweep, FIG. 4D shows the crosstalk when there was an artificial 2° phase shift at Vibe 1 at 22 Hz, and FIG. 4E shows the crosstalk when there was an artificial 15° phase shift at Vibe 1 at 22 Hz. These figures clearly show that the greater the phase shift, the greater the crosstalk (expressed as the "difference" between actual result and ideal result). The crosstalk will be more pronounced if there are more vibes in the survey, with the frequencies constantly changing the received signals will be contaminated and undesirable or even unusable, as illustrated in FIG. 1 and FIG. 2.

Figure 4F:
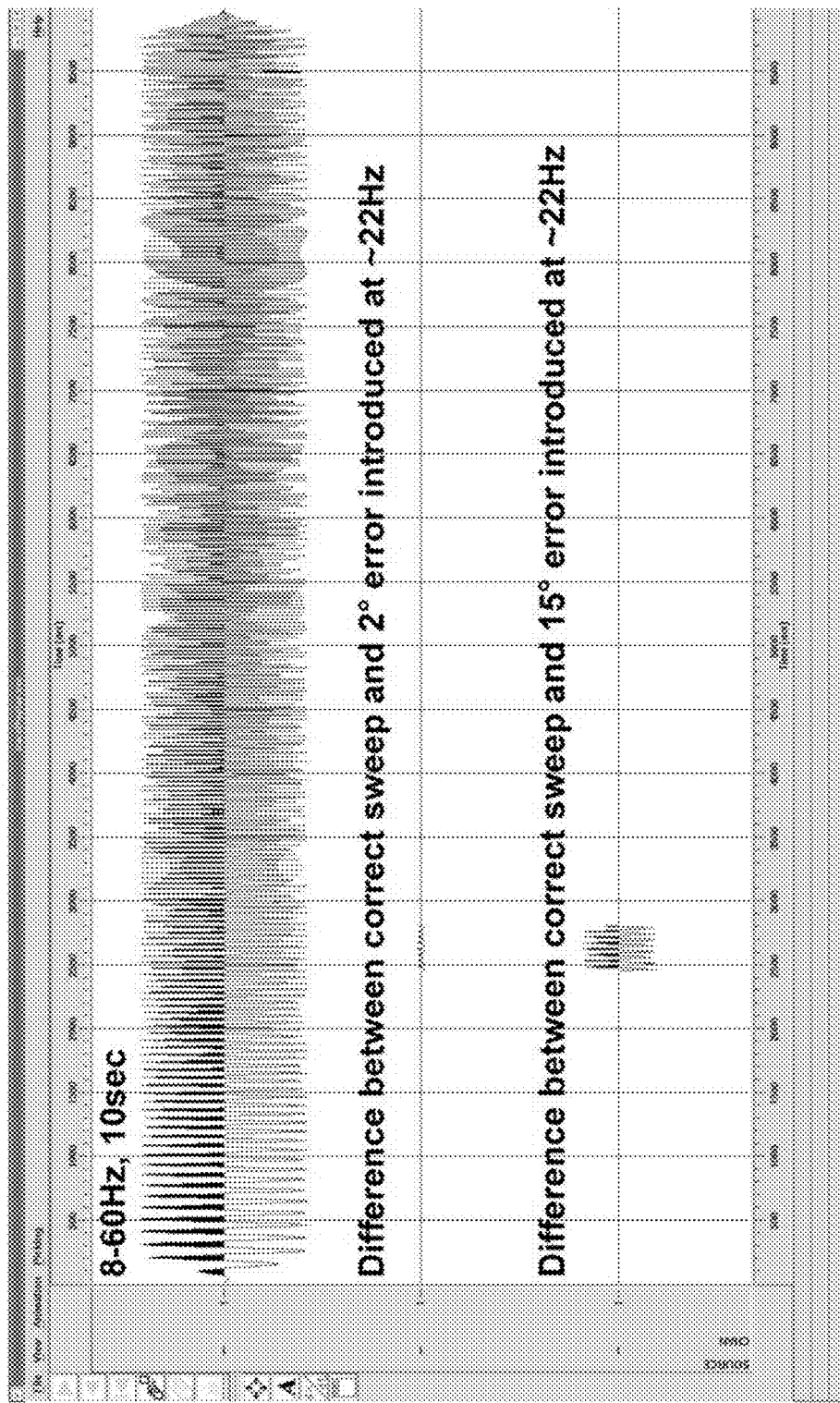

This is further verified in the amplitude diagram shown in FIG. 4F. The top of FIG. 4F shows the entire sweep result received by the receiver. The middle of FIG. 4F shows the difference between an ideal sweep and a 2° error introduced at about 22 Hz, and the bottom of FIG. 4F shows the difference between an ideal sweep and a 15° error introduced at about 22 Hz. It is shown that the difference becomes more significant with the increase in phase error.

Figure 3:
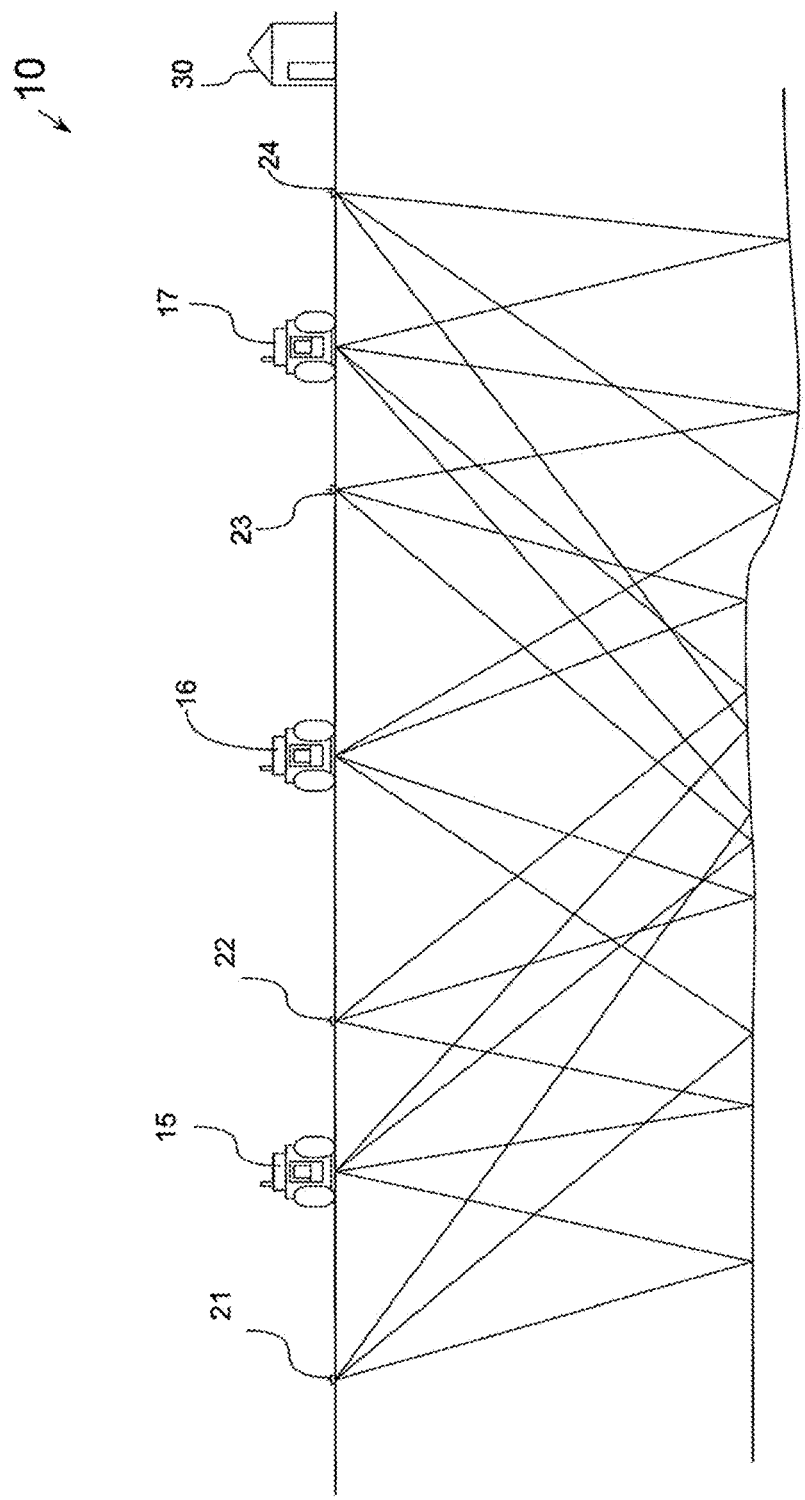
FIG. 3. is a fragmentary, cross-sectional view of the earth with three vibratory seismic sources emitting seismic energy into the earth and recording the returning wavefield at four receiver locations.

As a general matter, the setup of the seismic acquisition system is shown in FIG. 3, in which a seismic acquisition system 10 is shown comprising three seismic vibrators 15, 16 and 17 along with receivers 21, 22, 23, and 24. All of the receivers 21-24 provide the received signals to recording system 30 either by direct hard wire as it is received or by download sometime after the recorded event such as in the case of autonomous node type recorders. The acquisition system 10 as shown is a simple representation of the source and receiver configuration used for a typical seismic acquisition project using e.g., the HFVS or ZenSeis® geophysical prospecting systems where the sources are activated simultaneously or near simultaneously creating a composite seismic record with all sources contributing, albeit in offset phases.

In such methods, each source must be activated as many times at the same location as there are sources that will be activated simultaneously or near simultaneously creating a composite seismic record of each activation. These composite seismic records along with an estimated source signature, typically a computed ground force estimate, are input to an inversion program that separates the composite seismic records in to records that primarily only have seismic data resulting from one of the activated sources. Basically, the output of the inversion is one seismic data record for each activated source. Typically, the location of each activated source can be identified to some extent in each of the other seismic data records after inversion. A slight error in the phase may cause the composite seismic record to be unusable, and this is referred to as source generated data contamination and is not desirable.

We propose that this phase error induced crosstalk is frequency-dependent, in other words, the resulted crosstalk is not uniform across the frequency range, but may vary as the frequency changes. Our testing data also suggests that additional phase error may come from the number of sweeps conducted at the same location. Therefore, we invented a process for further determining the exact phase errors from the vibrators. To avoid source generated data contamination, specifically resulted from phase error, we propose the following method.

Figure 5:
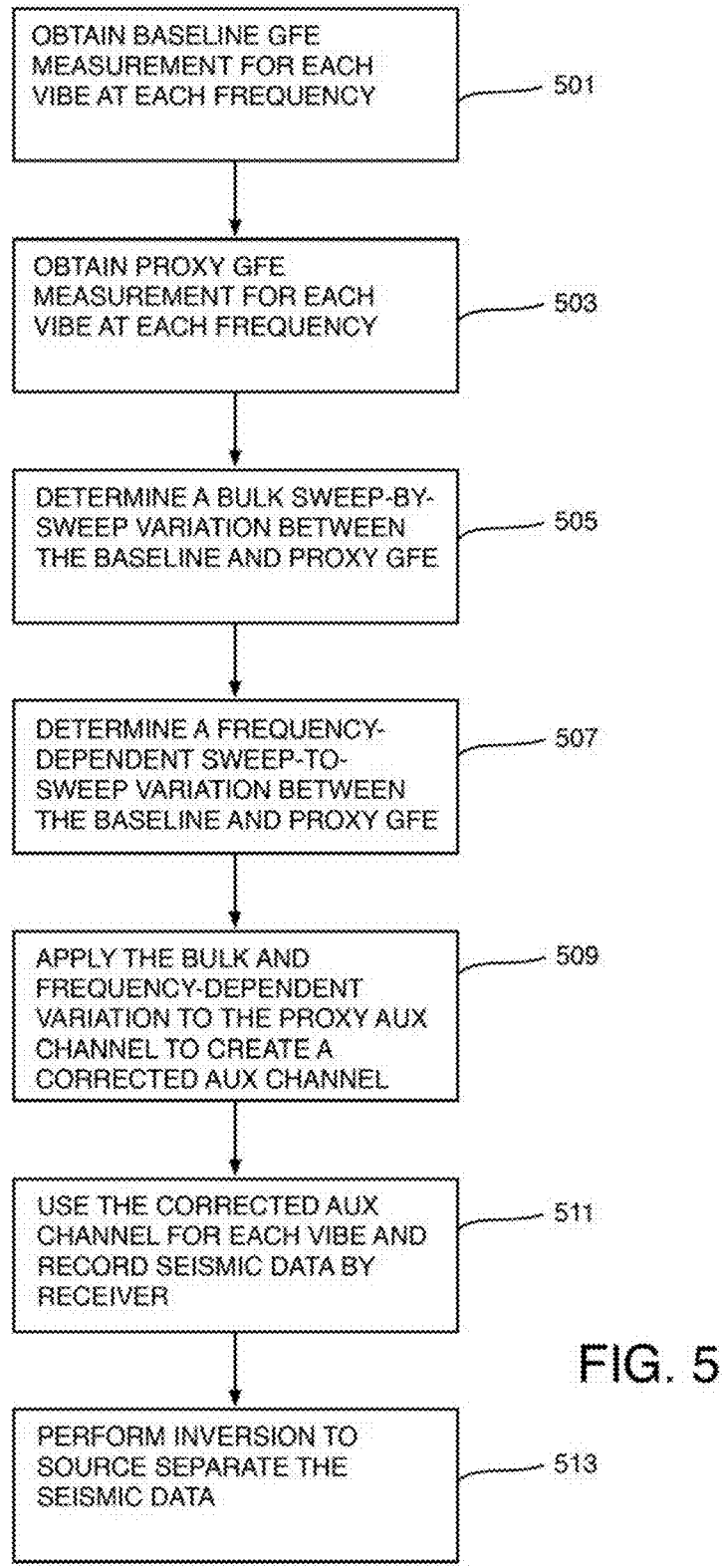
FIG. 5 is a flow chart illustrating the method of this disclosure.

The steps of this invention is described in FIG. 5. FIG. 5 illustrates the method of this disclosure in a flow chart. The first step 501 is to obtain a baseline GFE measurement for each vibe at each frequency used in an actual seismic survey. The second step 503 is obtaining a proxy GFE measurement for each vibe at each frequency used in an actual seismic survey. In both steps the vibes and receivers are setup in an actual setting where the seismic survey is to be conducted, such that the ground conditions are identical. Typically in a seismic survey the frequency ranges from 20 Hz to 200 Hz. For accuracy purposes both steps 501 and 503 are conducted at each frequency within the range, or alternatively at the frequencies with a 10 Hz interval, e.g. 20 Hz, 30 Hz, 40 Hz . . . 200 Hz, or with other intervals such as 15 or 20 Hz apart. The point is to acquire enough data points for meaningful comparison.

In step 505, a bulk sweep-by-sweep variation (or coefficient) between the baseline GFE and proxy GFE are determined. In step 507, a frequency-dependent sweep-to-sweep variation (or coefficient) between the baseline GFE and proxy GFE are determined. In both steps, the bulk variation and the frequency-dependent variation can be determined by, for example, the following formula:

$$GFE_b = e_b \cdot GFE_p + V_f \quad (1)$$

wherein $GFE_b$ is the baseline GFE; $GFE_p$ is the proxy GFE; $e_b$ is the bulk variation coefficient; and $V_f$ is the frequency-dependent variation;

or $$GFE_b = GFE_p + V_b \quad (2)$$

wherein $GFE_b$ is the baseline GFE; $GFE_p$ is the proxy GFE; $V_b$ is the bulk variation; f is frequency; and $e_f$ is the frequency-dependent variation.

After bulk variation and the frequency-dependent variation are determined, in step 509 they are applied to a proxy aux channel, which is responsible for generating the vibe signal in the seismic survey, to correct the input vibe signal. The corrected aux channel is then used in step 511 as the input vibe signal to initiate the actual seismic survey, and the seismic data is also recorded by receivers.

Finally in step 513, an inversion is performed based on the corrected input vibe signal to source separate the recorded seismic data. Because the phase errors (bulk+phase dependent) have been largely removed in the corrected aux channel, the source separation is more accurate.

It is to be noted that in addition to, or instead of, measuring the bulk and frequency-dependent phase errors, it is also possible to measure the bulk and frequency-dependent amplitude errors, which are then applied to correcting the proxy aux channels to generate the corrected proxy aux channels. In an alternative embodiment, the phase errors and the amplitude errors can be measured and corrected simultaneously to generate more accurate corrected aux channels to facilitate source separation.

Establishing Baseline

The first step of the inventive method is to establish a baseline where the phase shifts are measured and quantified. This is normally done at the start of the project in a representative area for the survey with each of the vibratory sources to be used. The inventive approach is to normally set up our load cells (or use one of other methods for measuring the true source signature output of the source relative to the desired input signal) and run each of the sources over the load cells and measure their particular response function for the desired sweep. By moving the load cells from position to a new position between each vibe testing, one can quantify the sweep-to-sweep variation of that particular source and then compare to the desired input source signal.

One of the questions that has to be established at this step is what measurement or signal provided by the source controller will be used as the proxy function for the actual ground force put out by the source. Most industry standard source controllers provide a measure of the reaction mass acceleration, the baseplate acceleration and a ground force estimate via the Sallas approximation. By using each one of these measurements and then comparing them to output of the load cells the best match can be determined. With that proxy function determined for the source signal, the bulk phase shift and the frequency dependent phase shift can be determined for each sweep. It would be desirable to have load cells or capacitance based pads installed in the baseplate of the vibrator to measure the true phase and force exerted by the vibrator for every source position but currently this technology still has not been fully developed.

Determining the Bulk and Frequency-Dependent Shifts

The method used to determine the frequency dependent and bulk phase shifts is varied, but as a simplified example we can simply subtract the load cells signal in a sample-by-sample basis from the proxy function determined above (for example the source controller ground force estimate). This difference in phase can then be averaged over the whole sweep to determine the bulk phase shift. The difference in phase can then have the bulk phase shift removed and the residual is the time and sweep varying frequency dependent shifts. These two phase corrections could also be determined by convolutional process, match filters, or similar processing steps.

Compensating for the Shifts

The next step of the inventive method is to store the shifts per sweep as a correction function to be applied to the measured proxy of the ground force for subsequent sweeps. These corrections are normally stored as separate correction arrays that are applied during the inversion and separation process in the processing center. Each correction function is applied to the measured proxy function determined previously prior to the input to the inversion process. In the simplest case they are added to the proxy function on a sweep-by-sweep basis as part of the aux channels. This new corrected aux channel is then selected as part of the input to the inversion process and the output of this process is the normal summed and separated shot records for the input setup. It should be noted that while the phase is the critical input for the separation and minimization of the cross talk between source records, the correction function could also be applied to amplitude variations in a similar manner as the phase corrections to improve the interpretability of the data.

As has been discussed above, it is recognized that the shifts are dependent upon the ground conditions at each sweep. In the optimal case, the actual ground forces would be measured via some external method like the load cells (or similar technology) at every location. This data could then be used to determine a sweep-by-sweep, shot-by-shot correction function for the phase shifts using the method described above. Unfortunately at this time, the technology to accomplish this is not robust enough to operate in the field on a day-to-day basis. The existing mats and measurement devices that are between the baseplate and the ground tend to be torn up and the load cells while robust enough are quite heavy and cumbersome to move around from position to position.

In light of these limitations, we measured a series of source points and determined that the shifts tend to be consistent from sweep-to-sweep and from source-to-source over reasonably consistent ground conditions. Thus, the corrections could be applied with good results as long as the surface conditions did not vary much beyond the baseline case. If the conditions do vary, then the baseline would be reestablished following the baseline procedure described previously and new shifts determined. The new shifts could be substituted in at the appropriate time when the sources moved from one ground regime to another ground regime. By extension, one can surmise that over time on a particular survey different shifts could be established by following the baseline method for each of the different ground conditions and then the data applied appropriately in the pre-inversion step of processing to solve from the bulk shift and frequency dependent variations around the survey.

In summary, conventional art for both vibroseis, HFVS or similar phase based SMS fails to recognize that not only there is phase error in using the ground force estimate as a proxy for the actual source signature, but also an additional phase error that is frequency dependent and varying. Therefore identifying one single phase error to be applied to all frequencies within the sweep range is not the ideal solution and only an incremental step in fixing this source of cross talk error. By implementing this invention, we envision the source generated data contamination resulted from phase errors can be greatly reduced by as much as 80%. This will significantly improve the inversion results and source separation, as the phase error can be corrected with more accuracy.

The following citations are incorporated by reference in their entirety for all purposes.

Chiu S. K. et al., High-resolution Reservoir Mapping by Simultaneous Vibratory Sources, GeoCanada 2010—Working with the Earth, available online at http://www.cspg.org/documents/Conventions/Archives/Annual/2010/0171_GC2010 High-resolution Reservoir_Mapping.pdf SEG-2009-011: Shaw, S. A., et al., Vibroseis Source Signature Uncertainty And Its Impact On Simultaneous Sourcing, 2009 SEG Annual Meeting, Oct. 25-30, 2009.

SEG-2005-1650: Chiu S. K., et al., High Fidelity Vibratory Seismic (HFVS): Robust Inversion Using Generalized Inverse, 2005 SEG Annual Meeting, Nov. 6-11, 2005.

SEG-2005-0037: Chiu S. K., et al., High Fidelity Vibratory Seismic (HFVS): Optimal Phase Encoding Selection, 2005 SEG Annual Meeting, Nov. 6-11, 2005.

US20100208554
US20110272206
US20120014212
US20120033529
US20120035853
US20120039150
US2012008775
U.S. Pat. Nos. 5,550,786, 5,715,213, and 5,721,710
U.S. Pat. No. 7,295,490
U.S. Pat. No. 8,371,416
U.S. Pat. No. 8,467,267

What is claimed is:

1. A method of source separating composite seismic data, the method comprising:
   obtaining, via at least one seismic receiver, a baseline measurement of a source seismic energy signal, via two or more vibratory sources, at a plurality of predetermined frequencies within a predetermined frequency range, wherein the two or more vibratory sources operate at a same time but in offset phases;
   obtaining, via the at least one seismic receiver, a simultaneous proxy measurement of the source seismic energy signal, via the two or more vibratory sources, at the plurality of predetermined frequencies within the predetermined frequency range;
   measuring a bulk sweep-to-sweep phase variation between the baseline measurement and the simultaneous proxy measurement of an output source seismic energy to determine a bulk phase error;
   measuring a frequency dependent sweep-to-sweep phase variation between the baseline measurement and the simultaneous proxy measurement to determine a frequency dependent phase error;
   applying the bulk phase error and the frequency dependent phase error to a proxy source signal as an aux channel to create a corrected aux channel for each of the two or more vibratory sources for each of the bulk sweep-to-sweep phase variation and the frequency dependent sweep-to-sweep phase variation;
   inputting the corrected aux channel for the two or more vibratory sources and receiving and recording a composite seismic data with the at least one seismic receiver into an inversion program; and
   performing an inversion on the composite seismic data to source separate the composite seismic data for each of the two or more vibratory sources.

2. The method of claim 1, wherein each of the two or more vibratory sources comprises a baseplate for delivering the source seismic energy signal into the earth, and wherein the at least one seismic receiver is one or more baseline measurements of output source seismic signals are obtained via load cells and/or independent pressure transducers located between the baseplate and the ground.

3. The method of claim 1, wherein the baseline measurements of output source seismic signals are obtained via one or more load cells and/or independent sensors located on a baseplate.

4. The method of claim 1, wherein the baseline measurements of output source seismic signals are obtained via one or more load cells and/or independent sensors located off a baseplate.

5. The method of claim 1, wherein in step a) the baseline measurement includes a phase value and an amplitude value of each of the source seismic energy signal.

6. The method of claim 1, wherein in step b) the proxy measurement includes a phase value and an amplitude value of each of the source seismic energy signal.

7. The method of claim 1, wherein a new baseline measurement of a source seismic signal and a new simultaneous proxy measurement of the source seismic signal is obtained the steps a)-g) are performed again when ground conditions change significantly.

8. A method of claim 1, wherein the two or more vibratory sources are not intentional phase varied or frequency varied and wherein operated at the same basic sweep.

* * * * *